US012412287B2

(12) United States Patent
He et al.

(10) Patent No.: US 12,412,287 B2
(45) Date of Patent: Sep. 9, 2025

(54) GLOBAL REGISTRATION METHOD BASED ON SPHERICAL HARMONIC TRANSFORMATION (SHT) AND ITERATIVE OPTIMIZATION

(71) Applicant: SHANGHAITECH UNIVERSITY, Shanghai (CN)

(72) Inventors: Chengzhang He, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 138 days.

(21) Appl. No.: 18/518,465

(22) Filed: Nov. 23, 2023

(65) Prior Publication Data
US 2024/0212175 A1  Jun. 27, 2024

Related U.S. Application Data

(63) Continuation of application No. PCT/CN2023/083254, filed on Mar. 23, 2023.

(30) Foreign Application Priority Data

Dec. 27, 2022 (CN) .......................... 202211684403.3

(51) Int. Cl.
*G06T 7/32* (2017.01)
*G06T 7/33* (2017.01)
(Continued)

(52) U.S. Cl.
CPC ................ *G06T 7/32* (2017.01); *G06T 7/337* (2017.01); *G06T 7/37* (2017.01); *G06T 17/00* (2013.01);
(Continued)

(58) Field of Classification Search
CPC .......... G06T 17/00; G06T 2207/10028; G06T 2207/20048; G06T 2210/56; G06T 7/32; G06T 7/33; G06T 7/337; G06T 7/37
See application file for complete search history.

(56) References Cited

U.S. PATENT DOCUMENTS 8,057,463 B2 *  11/2011  Zadoyan ............. G02B 26/101
                                                   606/4
2015/0254857 A1   9/2015  Huang et al.
(Continued)

FOREIGN PATENT DOCUMENTS

| CN | 110009667 A | 7/2019 |
| CN | 114612534 A | 6/2022 |
| CN | 115049813 A | 9/2022 |

*Primary Examiner* — Ming Wu
(74) *Attorney, Agent, or Firm* — Bayramoglu Law Offices LLC

(57) ABSTRACT

A global registration method based on spherical harmonic transformation (SHT) and iterative optimization is provided. Two assumptions are provided: firstly, it is predefined that a minimum percentage of a correct matching pair in an input point cloud is represented as a limit on a quantity of outliers in the point cloud, and secondly, a distance threshold used to determine the correct matching pair is preset based on a scenario and represented as a limited distance of an outlier in the point cloud. In the algorithm provided, the point cloud first undergoes coarse registration to obtain a plurality of search domains, and the search domains are sorted based on an evaluation criterion. A branch and bound method is used to exclude an incorrect search domain and obtain a final registration result.

3 Claims, 1 Drawing Sheet

(51) Int. Cl.
*G06T 7/37* (2017.01)
*G06T 17/00* (2006.01)
(52) U.S. Cl.
CPC ............. *G06T 2207/20048* (2013.01); *G06T 2210/56* (2013.01)

(56) References Cited

U.S. PATENT DOCUMENTS

| | | | |
|---|---|---|---|
| 2021/0158546 A1* | 5/2021 | He | G01S 17/89 |
| 2022/0016779 A1* | 1/2022 | Wang | G06T 7/50 |
| 2022/0111531 A1* | 4/2022 | Wang | B25J 9/1664 |

* cited by examiner

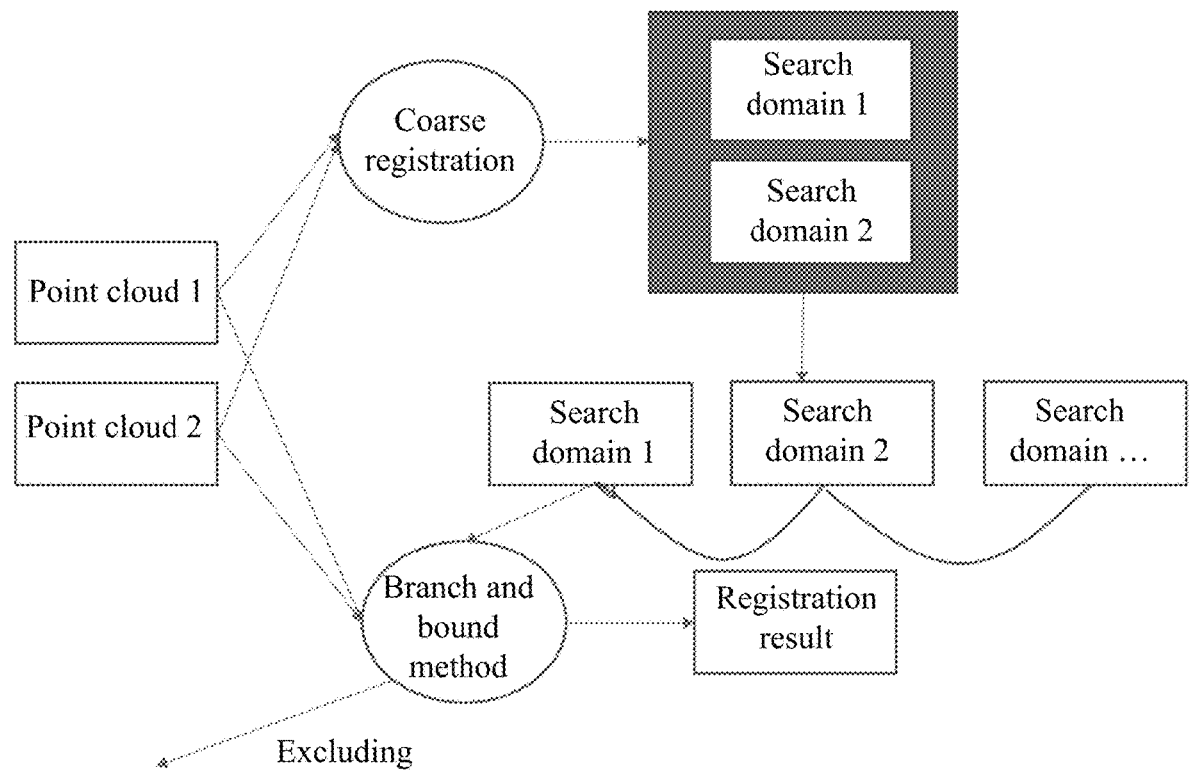

GLOBAL REGISTRATION METHOD BASED ON SPHERICAL HARMONIC TRANSFORMATION (SHT) AND ITERATIVE OPTIMIZATION

CROSS REFERENCE TO THE RELATED APPLICATIONS

This application is a continuation application of International Application No. PCT/CN2023/083254, filed on Mar. 23, 2023, which is based upon and claims priority to Chinese Patent Application No. 202211684403.3, filed on Dec. 27, 2022, the entire contents of which are incorporated herein by reference.

TECHNICAL FIELD

The present disclosure relates to a global registration method.

BACKGROUND

Global registration is to find an optimal coordinate system conversion method for enabling two pieces of coincident point cloud data in different coordinate systems to coincide. Global point cloud registration is widely used in fields that lack initial positioning or have a high requirement for algorithm stability, such as motion estimation, three-dimensional (3D) reconstruction, 3D object recognition, 3D object detection, unmanned driving, and intelligent robots.

Due to the non-convexity of a registration optimization problem, a conventional algorithm is prone to falling into a local minimum. A theoretical proof shows that a global registration method ensures that an algorithm result certainly converges to a global optimal solution. Existing global registration algorithms are mainly classified into two types: a global registration algorithm based on feature point correspondence and a global registration algorithm based on original point cloud data. In the existing implementation of global registration, it takes a long time to narrow a search scope, or sufficient accuracy cannot be achieved. Therefore, for an application scenario with a higher speed and a higher accuracy requirement, it is difficult to apply global registration to the practical scenario. A good global registration algorithm needs to meet following four conditions:
1) The algorithm focuses on an original point cloud rather than a feature point to maintain high accuracy.
2) The algorithm has lower complexity than the existing algorithm.
3) The algorithm ensures that in an initial operation, a search domain is quickly narrowed to a global optimal domain.
4) When dealing with an application scenario with a high precision requirement, the algorithm accelerates the convergence speed, in other words, reduces the quantity of subsequent iterations and deletes the redundant search domain.

SUMMARY

A technical problem to be resolved by the present disclosure is that in existing implementation of global registration, it takes a long time to narrow a search scope or sufficient accuracy cannot be achieved.

In order to resolve the foregoing technical problem, technical solutions of the present disclosure provide a global registration method based on spherical harmonic transformation (SHT) and iterative optimization, where based on following two assumptions: firstly, it is predefined that a minimum percentage of a correct matching pair in an input point cloud is represented as a limit on a quantity of outliers in the point cloud, and secondly, a distance threshold used to determine the correct matching pair is preset based on a scenario and represented as a limited distance of an outlier in the point cloud, the global registration extraction method includes the following steps:

step 1: aligning the point cloud in a frequency domain by using a spherical harmonic based on the second assumption, and determining a plurality of small point cloud search domains based on a peak phase difference and the first assumption;

step 2: allocating, by analyzing a hit rate and search time of a search domain, a search order for the plurality of point cloud search domains determined in step 1, where a formula for estimating the hit rate is as follows:

$$F_h(r) = LB + f(r) - f\left(\frac{r}{2}\right) - E*$$

where LB represents a lower bound, $LB=LB_{our}=\Sigma_{i=1}^{N_{in}}|residual_i|-N_{in}*(C*radius-caf)$, $N_{in}$ represents a quantity of point cloud matching pairs, $residual_i$ represents a matching error of an $i^{th}$ matching pair, radius represents a radius of the search domain, C represents a constant, caf represents a centralized attenuation factor, r represents the radius of the search domain, f(•) represents a selectable function, and E* represents a value of a current optimal optimization function; and a formula for estimating the search time is as follows:

$$F_t(r) = r^o * (LB - E*)$$

where o represents a selectable parameter; and step 3: performing search in the plurality of point cloud search domains in the order determined in step 2 by using a branch and bound method; and during the search, if an optimal solution is not within a current search domain, excluding the current search domain by using the branch and bound method; and if the optimal solution is within the current search domain, finding the optimal solution by using the branch and bound method, where in a branch and bound process, a check condition shown in a following formula is introduced:

$$N_{in} \le H_T * N$$

where $H_T$ represents a proportion of the quantity of point cloud matching pairs in the first assumption, and N represents a size of the input point cloud.

Preferably, step 1 includes the following substeps:

step 101: voxelizing two input point clouds, and performing SHT to obtain frequency domain signals of the two input point clouds, where a formula for voxelizing the two input point clouds is as follows:

$$F([x,y,z]^T) = \begin{cases} 1 & \text{iff } x = \left\lceil \frac{x'}{\max} \right\rceil \ y = \left\lceil \frac{y'}{\max} \right\rceil \ z = \left\lceil \frac{z'}{\max} \right\rceil \\ 0 & \text{otherwise} \end{cases}$$

where $F([x,y,z]^T)$, allowed to be regarded as a function, represents an obtained voxelized point cloud; $\forall [x',y',z']^T \in PC$, and PC represents the input point cloud; and max represents a maximum norm of a point in the input point cloud;

the SHT is calculated according to following formulas:

$$Y_l^m(x,y,z) = (-1)^m \sqrt{\frac{(2l+1)(l-m)!}{4\pi(l+m)!}} P_l^m(z) e^{-l m \arg(y/x)}$$

$$P_l^m(x) = \frac{(-1)^m}{2^l l!} \sqrt{(1-x^2)^m} \frac{d^{l+m}(x^2-1)^l}{dx^{l+m}}$$

$$F = \sum_{l \geq 0} \sum_{|m| \leq l} a_l^m Y_l^m(x,y,z)$$

where: (x,y,z) represents coordinates of the point, m represents a superscript of a spherical harmonic function, l represents a subscript of the spherical harmonic function, $Y_l^m(x,y,z)$ represents the spherical harmonic function, $P_l^m(z)$ represents an associated Legendre polynomial, d represents a differential, F represents $F([x,y,z]^T)$, and $a_l^m$ represents a base coefficient of the spherical harmonic function; and a result obtained by calculating the SHT is $a_l^m$;

step 102: calculating a standard correlation function SCR(g) of the frequency domain signals of the two input point clouds, as shown in following formulas:

$$SC_R(g) = \int_{x,y,z} MSA(g) TA\, dxdydz$$

$$D_{km}^l(\alpha,\beta,\gamma) = e^{-ik\alpha} d_k m^l(\beta) e^{-im\gamma}$$

$$MSA_l^m(g) = \sum_{|k| \leq l} D_{km}^l(\alpha,\beta,\gamma) Y_l^m(x,y,z)$$

where MSA(g) represents $MSA_l^m(g)$, $MSA_l^m(g)$ represents a base coefficient matrix of a spherical harmonic of a point cloud of a model, $(\alpha,\beta,\gamma)$ represents an operation of rotating a corresponding Euler angle, km and l represent a superscript and a subscript, which are eliminated in summation, $D_{km}^l(\alpha,\beta,\gamma)$ represents a Wigner function, and $d_k m^l$ represents a Wigner distribution function; and step 103: finding all local maxima of the standard correlation function, and calculating the radius of the search domain based on an error function value of the local maximum, where a radius of a search domain corresponding to a local maximum is $$\frac{E}{D*D},$$

E represents a value of an optimization function corresponding to the local maximum, and D represents the limited distance of the outlier in the point cloud in the second assumption.

Preferably, the branch and bound method is implemented according to the following steps: for each search domain, calculating an error function value at a center of the current search domain, and estimating a lower function bound of the current search domain based on the error function value: if the lower function bound is greater than an existing best result, excluding the search domain; otherwise, splitting the current search domain into small search domains, and performing the foregoing process recursively, where when a size of the search domain is less than a target accuracy requirement, a center point of the search domain is the required optimal solution.

In an algorithm provided in the present disclosure, the point cloud first undergoes coarse registration to obtain a plurality of search domains, and the search domains are sorted based on an evaluation criterion. The branch and bound method is used to exclude an incorrect search domain and obtain a final registration result. The algorithm provided in the present disclosure can be applied to 3D reconstruction. Because the algorithm in the present disclosure is faster than all current global registration algorithms in the case of same accuracy, the present disclosure can achieve higher accuracy than all current algorithms for the 3D reconstruction within same time.

BRIEF DESCRIPTION OF THE DRAWINGS

The FIGURE schematically shows a process of global registration according to the present disclosure.

DETAILED DESCRIPTION OF THE EMBODIMENTS

The present disclosure will be further described below with reference to specific embodiments. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present disclosure.

The present disclosure analyzes complexity of an existing global registration algorithm and proposes two basic assumptions for accelerating a global registration solution. In a first assumption, it is predefined that a minimum percentage of a correct matching pair in an input point cloud is represented as a limit on a quantity of outliers in the point cloud, and in a second assumption, a distance threshold used to determine the correct matching pair is preset based on a scenario and represented as a limited distance of an outlier in the point cloud.

Based on the above two assumptions, the present disclosure provides a fast global registration algorithm with SHT and iterative optimization strategies, which specifically includes following content:

Step 1: The present disclosure provides a coarse-grained registration method that divides an entire search domain into a plurality of small search domains. The present disclosure aligns a point cloud in a frequency domain by using a spherical harmonic based on the second assumption (the limited distance of the outlier in the point cloud), and determines a small search domain based on a peak phase difference and the first assumption (the limit on the quantity of outliers in the point cloud). According to this method, the present disclosure obtains a plurality of point cloud search domains from two input point clouds and the two assumptions, which specifically includes the following substeps:

Step 101: The two input point clouds are voxelized, and SHT is performed to obtain frequency domain signals of the two input point clouds.

A formula for voxelizing the two input point clouds is as follows:

$$F([x, y, z]^T) = \begin{cases} 1 & \text{iff } x = \left\lceil \frac{x'}{\max} \right\rceil, y = \left\lceil \frac{y'}{\max} \right\rceil, z = \left\lceil \frac{z'}{\max} \right\rceil \\ 0 & \text{otherwise} \end{cases}$$

In the above formula, $F([x,y,z]^T)$, allowed to be regarded as a function, represents an obtained voxelized point cloud; $\forall [x',y',z']^T \in PC$, and PC represents the input point cloud; and max represents a maximum norm of a point in the input point cloud.

The SHT is calculated according to following formulas:

$$Y_l^m(x, y, z) = (-1)^m \sqrt{\frac{(2l+1)(l-m)!}{4\pi(l+m)!}} P_l^m(z) e^{-im\arg(y/x)}$$

$$P_l^m(x) = \frac{(-1)^m}{2^l l!} \sqrt{(1-x^2)^m} \frac{d^{l+m}(x^2-1)^l}{dx^{l+m}}$$

$$F = \sum_{l \geq 0} \sum_{|m| \leq l} a_l^m Y_l^m(x, y, z)$$

In the above formulas: (x,y,z) represents coordinates of the point, m represents a superscript of a spherical harmonic function, l represents a subscript of the spherical harmonic function, $Y_l^m(x,y,z)$ represents the spherical harmonic function, $P_l^m(z)$ represents an associated Legendre polynomial, d represents a differential, F represents $F([x,y,z]^T)$, and $a_l^m$ represents a base coefficient of the spherical harmonic function.

A result obtained by calculating the SHT is $a_l^m$.

Step 102: A standard correlation function $SC_R(g)$ of the frequency domain signals of the two input point clouds is calculated, as shown in following formulas:

$$SC_R(g) = \int_{x,y,z} MSA(g) TA dx dy dz$$

$$D_{km}^l(\alpha, \beta, \gamma) = e^{-ik\alpha} d_k m^l(\beta) e^{-im\gamma}$$

$$MSA_l^m(g) = \sum_{|k| \leq l} D_{km}^l(\alpha, \beta, \gamma) Y_l^m(x, y, z)$$

In the above formulas, MSA(g) represents $MSA_l^m(g)$, $MSA_l^m(g)$ represents a base coefficient matrix of a spherical harmonic of a point cloud of a model, $(\alpha,\beta,\gamma)$ represents an operation of rotating a corresponding Euler angle, km and l represent a superscript and a subscript, which are eliminated in summation, $D_{km}^l(\alpha,\beta,\gamma)$ represents a Wigner function, and $d_k m^l$ represents a Wigner distribution function.

Step 103: All local maxima of the standard correlation function are found, and a radius of the search domain is calculated based on an error function value of the local maximum. A radius of a search domain corresponding to a local maximum is $$\frac{E}{D*D},$$

where E represents a value of an optimization function corresponding to the local maximum, and D represents the limited distance of the outlier in the point cloud in the second assumption.

Step 2: Based on a new evaluation criterion, a search order is allocated for the plurality of point cloud search domains determined in step 1, so as to obtain an optimal solution more quickly. The present disclosure calculates the evaluation criterion by analyzing a hit rate and search time of the search domain.

A formula for estimating the hit rate is as follows:

$$F_h(r) = LB + f(r) - f\left(\frac{r}{2}\right) - E^*$$

In the above formula, LB represents a lower bound, $LB = LB_{our} = \sum_{i=1}^{N_{in}} |residual_i| - N_{in} * (C * radius - caf)$, $N_{in}$ represents a quantity of point cloud matching pairs, $residual_i$ represents a matching error of an $i^{th}$ matching pair, radius represents the radius of the search domain, C represents a constant (which is 2 multiplied by a square root of 3 in this embodiment), caf represents a centralized attenuation factor, r represents the radius of the search domain, f(•) represents a selectable function (in this embodiment, f(•) adopts a linear function), and E* represents a value of a current optimal optimization function.

A formula for estimating the search time is as follows:

$$F_t(r) = r^o * (LB - E^*)$$

In the above formula, o represents a selectable parameter.

The present disclosure uses an estimated hit rate/estimated search time as the evaluation criterion to determine the search order of the search domains.

Step 3: Based on the order determined in step 2, search is performed in the plurality of point cloud search domains by using a branch and bound method. During the search, if the optimal solution is not within a current search domain, the current search domain is excluded by using the branch and bound method. If the optimal solution is within the current search domain, the optimal solution is found by using the branch and bound method.

A speed of the branch and bound method depends heavily on accuracy of bounding. Compared with other existing methods, a more accurate residual estimation method provided in the present disclosure makes the lower bound of the branch and bound method more accurate. In addition, based on the two assumptions proposed in the present disclosure, a new lower bound is introduced in the present disclosure to accelerate a running speed of the branch and bound method.

The branch and bound method is implemented according to the following steps: for each search domain, calculating an error function value at a center of the current search domain, and estimating a lower function bound of the current search domain based on the error function value: if the lower function bound is greater than an existing best result, excluding the search domain; otherwise, splitting the current search domain into small search domains, and performing the foregoing process recursively, where when a size of the search domain is less than a target accuracy requirement, a center point of the search domain is the required optimal solution. This recursive process ensures that if the function has and only has one optimal solution, the branch and bound method eventually converges to only one minimum search domain that is the required optimal solution.

A calculation method of the lower bound has been described in the previous text, and details are not described herein again. In addition, the present disclosure introduces a check condition (corresponding to the previous assumption) in a branch and bound process:

$$N_{in} \leq H_T * N$$

In the above formula, $H_T$ represents a proportion of the quantity of point cloud matching pairs in the first assumption, and N represents a size of the input point cloud. Based on the additional check condition, the present disclosure accelerates a search process of the branch and bound method.

Experimental results on a Stanford dataset and an RGB D object dataset show that the algorithm proposed in the present disclosure is on average 53.6% and 31.3% faster than most advanced non-correspondence-based and correspondence-based implementations respectively.

What is claimed is:

1. A global registration method based on spherical harmonic transformation (SHT) and iterative optimization, wherein based on following two assumptions: firstly, it is predefined that a minimum percentage of a correct matching pair in an input point cloud is represented as a limit on a quantity of outliers in the point cloud, and secondly, a distance threshold configured to determine the correct matching pair is preset based on a scenario and represented as a limited distance of an outlier in the point cloud, the global registration method comprises the following steps:

step 1: aligning the point cloud in a frequency domain by using a spherical harmonic based on the second assumption, and determining a plurality of small point cloud search domains based on a peak phase difference and the first assumption;

step 2: allocating, by analyzing a hit rate and search time of a search domain, a search order for the plurality of small point cloud search domains determined in step 1, wherein a formula for estimating the hit rate is as follows:

$$F_h(r) = LB + f(r) - f\left(\frac{r}{2}\right) - E^*$$

wherein LB represents a lower bound, $LB=LB_{our}=\Sigma_{i=1}^{N_{in}}|residual_i|-N_{in}*(C*radius-caf)$, $N_{in}$ represents a quantity of point cloud matching pairs, $residual_i$ represents a matching error of an $i^{th}$ matching pair, radius represents a radius of the search domain, C represents a constant, caf represents a centralized attenuation factor, r represents the radius of the search domain, f(•) represents a selectable function, and E* represents a value of a current optimal optimization function; and a formula for estimating the search time is as follows:

$$F_t(r) = r^o * (LB - E^*)$$

wherein o represents a selectable parameter; and step 3: performing search in the plurality of small point cloud search domains in the search order determined in step 2 by using a branch and bound method; and during the search, if an optimal solution is not within a current search domain, excluding the current search domain by using the branch and bound method; and if the optimal solution is within the current search domain, finding the optimal solution by using the branch and bound method, wherein in a branch and bound process, a check condition shown in a following formula is introduced:

$$N_{in} \leq H_T * N$$

wherein $H_T$ represents a proportion of the quantity of point cloud matching pairs in the first assumption, and N represents a size of the input point cloud.

2. The global registration method based on the SHT and the iterative optimization according to claim 1, wherein step 1 comprises the following substeps:

step 101: voxelizing two input point clouds, and performing the SHT to obtain frequency domain signals of the two input point clouds, wherein a formula for voxelizing the two input point clouds is as follows:

$$F([x, y, z]^T) = \begin{cases} 1 & \text{iff } x = \left[\frac{x'}{\max}\right] y = \left[\frac{y'}{\max}\right] z = \left[\frac{z'}{\max}\right] \\ 0 & \text{otherwise} \end{cases}$$

wherein $F([x,y,z]^T)$, allowed to be regarded as a function, represents an obtained voxelized point cloud; $\forall [x',y',z']^T \in PC$, and PC represents the input point cloud; and max represents a maximum norm of a point in the input point cloud;

the SHT is calculated according to following formulas:

$$Y_l^m(x, y, z) = (-1)^m \sqrt{\frac{(2l+1)(l-m)!}{4\pi(l+m)!}} P_l^m(z) e^{-imarg(y/x)}$$

$$P_l^m(x) = \frac{(-1)^m}{2^l l!} \sqrt{(1-x^2)^m} \frac{d^{l+m}(x^2-1)^l}{dx^{l+m}}$$

$$F = \sum_{l \geq 0} \sum_{|m| \leq l} a_l^m Y_l^m(x, y, z)$$

wherein: (x,y,z) represents coordinates of the point, m represents a superscript of a spherical harmonic function, l represents a subscript of the spherical harmonic function, $Y_l^m(x,y,z)$ represents the spherical harmonic function, $P_l^m(z)$ represents an associated Legendre polynomial, d represents a differential, F represents $F([x,y,z]^T)$, and $a_l^m$ represents a base coefficient of the spherical harmonic function; and a result obtained by calculating the SHT is $a_l^m$;

step 102: calculating a standard correlation function $SC_R(g)$ of the frequency domain signals of the two input point clouds, as shown in following formulas:

$$SC_R(g) = \int_{x,y,z} MSA(g)TA dx dy dz$$

$$D_{km}^l(\alpha, \beta, \gamma) = e^{-ik\alpha} d_k m^l(\beta) e^{-im\gamma}$$

$$MSA_l^m(g) = \sum_{|k| \leq l} D_{km}^l(\alpha, \beta, \gamma) Y_l^m(x, y, z)$$

wherein MSA(g) represents $MSA_l^m(g)$, $MSA_l^m(g)$ represents a base coefficient matrix of a spherical harmonic of a point cloud of a model, $(\alpha,\beta,\gamma)$ represents an operation of rotating a corresponding Euler angle, $D_{km}^l(\alpha,\beta,\gamma)$ represents a Wigner function, and $d_k m^l$ represents a Wigner distribution function; and step 103: finding all local maxima of the standard correlation function, and calculating the radius of the search domain based on an error function value of the local maximum, wherein a radius of a search domain corresponding to a local maximum is $$\frac{E}{D*D},$$

E represents a value of an optimization function corresponding to the local maximum, and D represents the limited distance of the outlier in the point cloud in the second assumption.

3. The global registration method based on the SHT and the iterative optimization according to claim 1, wherein the branch and bound method is implemented according to the following steps: for each search domain, calculating an error function value at a center of the current search domain, and estimating a lower function bound of the current search domain based on the error function value: if the lower function bound is greater than an existing best result, excluding the search domain; if the lower function bound is less than or equal to the existing best result, splitting the current search domain into small search domains, and performing the foregoing process recursively, wherein when a size of the search domain is less than a target accuracy requirement, a center point of the search domain is the required optimal solution.

* * * * *

UNITED STATES PATENT AND TRADEMARK OFFICE
CERTIFICATE OF CORRECTION

| | |
|---|---|
| PATENT NO. | : 12,412,287 B2 |
| APPLICATION NO. | : 18/518465 |
| DATED | : September 9, 2025 |
| INVENTOR(S) | : Yajun Ha and Chengzhang He |

It is certified that error appears in the above-identified patent and that said Letters Patent is hereby corrected as shown below:

On the Title Page

Item (12) "He et al." should read -- HA et al. --.

Item (72) Inventors should read: -- Yajun HA, Shanghai (CN); Chengzhang HE, Shanghai (CN) --.

Signed and Sealed this
Twenty-first Day of October, 2025

John A. Squires
*Director of the United States Patent and Trademark Office*